United States Patent
Weber et al.

(10) Patent No.: US 7,475,168 B2
(45) Date of Patent: Jan. 6, 2009

(54) VARIOUS METHODS AND APPARATUS FOR WIDTH AND BURST CONVERSION

(75) Inventors: Wolf-Dietrich Weber, San Jose, CA (US); Michael Meyer, Palo Alto, CA (US)

(73) Assignee: Sonics, Inc., Milpitas, CA (US)

( * ) Notice: Subject to any disclaimer, the term of this patent is extended or adjusted under 35 U.S.C. 154(b) by 158 days.

(21) Appl. No.: 11/078,185

(22) Filed: Mar. 10, 2005

(65) Prior Publication Data

US 2005/0216641 A1   Sep. 29, 2005

Related U.S. Application Data

(60) Provisional application No. 60/552,576, filed on Mar. 11, 2004.

(51) Int. Cl.
*G06F 13/00* (2006.01)
(52) U.S. Cl. .............. 710/35; 710/34; 710/60; 710/307
(58) Field of Classification Search ............ 710/33–35, 710/60, 65, 66, 110, 112, 307
See application file for complete search history.

(56) References Cited

U.S. PATENT DOCUMENTS

| | | | |
|---|---|---|---|
| 5,699,460 A | | 12/1997 | Kopet et al. |
| 5,745,791 A | * | 4/1998 | Peek et al. ............ 710/52 |
| 5,761,348 A | * | 6/1998 | Honma ............ 382/305 |
| 5,799,203 A | | 8/1998 | Lee et al. |
| 5,802,399 A | * | 9/1998 | Yumoto et al. ............ 710/66 |
| 5,948,089 A | | 9/1999 | Wingard et al. |
| 6,122,690 A | * | 9/2000 | Nannetti et al. ............ 710/311 |
| 6,182,183 B1 | | 1/2001 | Wingard et al. |
| 6,330,283 B1 | | 12/2001 | Lafe |

(Continued)

FOREIGN PATENT DOCUMENTS

EP   1 179 785 A   2/2002

(Continued)

OTHER PUBLICATIONS

Enabling Reuse Via an IP Core-Centric Communications Protocol: Open Core Protocol, Wolf-Dietrich Weber, Sonics, Inc.*

(Continued)

*Primary Examiner*—Khanh Dang
(74) *Attorney, Agent, or Firm*—Rutan & Tucker, LLP

(57) ABSTRACT

Methods and apparatuses are described for a communication system. The communication system may include one or more initiator agents, where each agent couples to its own Intellectual Property core. The communication system may also include two or more target agents, where each agent couples to its own Intellectual Property core. The communication system may also include an interconnect using an end-to-end width conversion mechanism. The conversion mechanism converts data widths between the initiator agent and a first target agent. Two or more branches of pathways in the interconnect exist between the initiator agent and the two or more target agents. The conversion mechanism to use a lookup table that includes data width information of the initiator agent and the two or more branches of pathways to the two or more target agents to concurrently pre-compute width conversion signals for each of the target agent branches.

38 Claims, 9 Drawing Sheets

U.S. PATENT DOCUMENTS

| | | | |
|---|---|---|---|
| 6,393,500 | B1 | 5/2002 | Thekkath |
| 6,678,423 | B1 | 1/2004 | Trenary et al. |
| 6,725,313 | B1 | 4/2004 | Wingard et al. |
| 6,785,753 | B2 | 8/2004 | Weber et al. |
| 6,868,459 | B1 * | 3/2005 | Stuber .................... 710/35 |
| 6,891,088 | B1 * | 5/2005 | Neuhaus et al. ......... 800/317.2 |
| 6,970,013 | B1 * | 11/2005 | Cory ...................... 326/38 |
| 6,981,088 | B2 | 12/2005 | Holm et al. |
| 2002/0038393 | A1 | 3/2002 | Ganapathy et al. |
| 2002/0107903 | A1 | 8/2002 | Richter et al. |
| 2002/0161848 | A1 | 10/2002 | Willman et al. |
| 2003/0099254 | A1 | 5/2003 | Richter |
| 2003/0191884 | A1 | 10/2003 | Anjo et al. |
| 2003/0212743 | A1 | 11/2003 | Masri et al. |
| 2004/0017820 | A1 | 1/2004 | Garinger et al. |
| 2005/0210164 | A1 | 9/2005 | Weber et al. |
| 2005/0216641 | A1 | 9/2005 | Weber et al. |
| 2006/0092944 | A1 * | 5/2006 | Wingard et al. ......... 370/395.2 |
| 2006/0095635 | A1 | 5/2006 | Vinogradov et al. |

FOREIGN PATENT DOCUMENTS

| | | | |
|---|---|---|---|
| JP | | 63 296158 A | 12/1988 |

OTHER PUBLICATIONS

Socket-Centric IP Core Interface Maximizes IP Applications, www.ocpip.org.*

IP Core-Centric Communications Protocol Introducing Open Core Protocol 2.0, www.design-reuse.com.*

MIPS32 24K Family of Synthesizable Processor Cores, Product Brief, MIPS Technologies, copyright 2005.*

Open Core Protocol Monitor, Datsheet, Mentor Graphics, Copyright 2005.*

AMBA 30 (AMBA AXI).*

NECoBus: A High-End SOC Bus With a Portable & Low Latency Wrapper-Based Interface Mechanism, Anjo et al., NEC Corporation, IEEE 2000.*

Open Core Protocol Specification, Release 2.0, pp. 1-3 and 31-57, Copyright 2003.*

Definition of Burst Mode Access and Timing, www.pcguide.com.*

Definition of Direct Memory Access (DMA) Modes and Bus Mastering DMA, www.pcguide.com.*

Definition of PCI Bus Performance, www.pcguide.com.*

Weiss, Ray, "PCI-X Exposed," TechOnLine, http://www.techonline.com/community/ed_resource/feature_article/7114, Jun. 28, 2005.

Culler, David E.: "Split-Phase Busses," CS 258, Computer Science Division, U.C. Berkely, Spring 1999, pp. 1-23.

International Search Report, PCT/US2005/008239, mailed Jun. 13, 2005, 3 pp.

International Search Report, PCT/US2005/008235, mailed Nov. 30, 2005, 6 pp.

* cited by examiner

Table of Helper Signal Types and Their Use

| Signal | Usage |
|---|---|
| packop | determines pad/strip versus pack/unpack |
| packwords | identifies valid sub-words |
| packorder | identifies order of sub-words to pack/unpack |
| burstlast | identifies end of burst |
| wordlast | identifies end of initiator word |
| littleendian | identifies endianness of width conversion |

FIG. 7

Table of OCP Burst Characteristics

| Characteristic | Choices |
| --- | --- |
| Address sequence | DFLT1, DFLT2, INCR, STRM, UNKN, WRAP, XOR |
| Burstlength precision | precise or imprecise |
| Request kind | single-request multiple data (SRMD) or multiple-request multiple data (MRMD) |
| Byte Enabled | Enabled, Not-Enabled |

FIG. 8

VARIOUS METHODS AND APPARATUS FOR WIDTH AND BURST CONVERSION

RELATED APPLICATIONS

This application claims the benefit of U.S. provisional patent application Ser. No. 60/552,576, filed Mar. 11, 2004 and hereby incorporates by reference the contents of the provisional patent application.

FIELD OF THE INVENTION

The aspects of embodiments described herein apply to systems, especially Systems on a Chip, where an initiator core, which is sending data, has a different data word width and/or different burst characteristics than a target core, which is receiving the data, such that a conversion of the width and/or burst is required.

BACKGROUND

In computer networks, internetworking, communications, integrated circuits, etc. where there is a need to communicate information, there are often interconnections established to facilitate the transfer of the information. However, not all of the functional blocks connecting to a shared interconnect will have the same data width and burst type support communication capabilities. Some conversions should occur to make communications capable between functional blocks with different communication capabilities.

SUMMARY OF THE INVENTION

Methods and apparatuses are described for a communication system. The communication system may include one or more initiator agents, where each agent couples to its own Intellectual Property core. The communication system may also include one or more target agents, where each agent couples to its own Intellectual Property core. The communication system may also an end-to-end width conversion mechanism. The conversion mechanism converts data widths between the initiator agent and a first target agent. Two or more branches of pathways in the interconnect exist between the initiator agent and the two or more target agents. The conversion mechanism to use a lookup table, or internal logic, that includes data width information of the initiator agent and the two or more branches of pathways to the two or more target agents to concurrently pre-compute width conversion signals for each of the target agent branches.

BRIEF DESCRIPTION OF THE DRAWINGS

The present invention is illustrated by way of example and not limitation in the figures of the accompanying drawings, in which like references indicate similar elements and in which:

FIG. 7 illustrates a table of the different types of helper signals that may be used during width conversion.

FIG. 8 illustrates a table of Open Core Protocol (OCP) burst characteristics and the options available for each characteristic.

DETAILED DESCRIPTION

In the following description, numerous specific details are set forth, such as examples of specific protocol commands, named components, connections, types of burst capabilities, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

An example process of and apparatus to provide Width and Burst Conversion is described. The on-chip interconnect may contain a capability to manage end-to-end width conversion between independent initiator and target data path widths. Logic in an agent may compute target-dependent width support and burst type support information across multiple groups of potential targets at the same time, and then select the correct target-dependent information based upon the address decode result for the target selection. Thus, an initiator agent (hereinafter "IA") unit may use compiled knowledge of its and the addressed target's data width to pre-compute information to enable later stages (in the IA, target agent (hereinafter "TA"), a width conversion unit, or similar component) to accomplish the actual width conversion via packing, unpacking, padding, stripping, etc. —both for requests and responses. Pre-computing the width conversion information reduces the latency delay seen at each conversion stage in the core of the interconnect. In addition, an optimization can be performed in the IA that permits this pre-computation to be performed in parallel with the target selection (address decode) to further reduce logic delay in the path.

Each agent may also contain one or more burst conversion units. The Intellectual Property cores connected to the on-chip interconnect may have incompatible capabilities with respect to supporting different features and types of burst requests. For example, the supported burst address sequences, burst transaction lengths, and burst alignment restrictions may not match. The on-chip interconnect introduces a mechanism for allowing such cores to communicate, independent of either core needing to adapt its behavior. As with width conversion (discussed above), most of the arithmetic operations to make the different burst features compatible is performed in the IA. The IA compares the initiator burst request with the target burst support capabilities to determine the appropriate conversion action. Also, burst request conversion computations for all of the potential target agents may proceed in parallel with actual target selection (address decode) to further reduce logic delay in the path.

Figure 1:
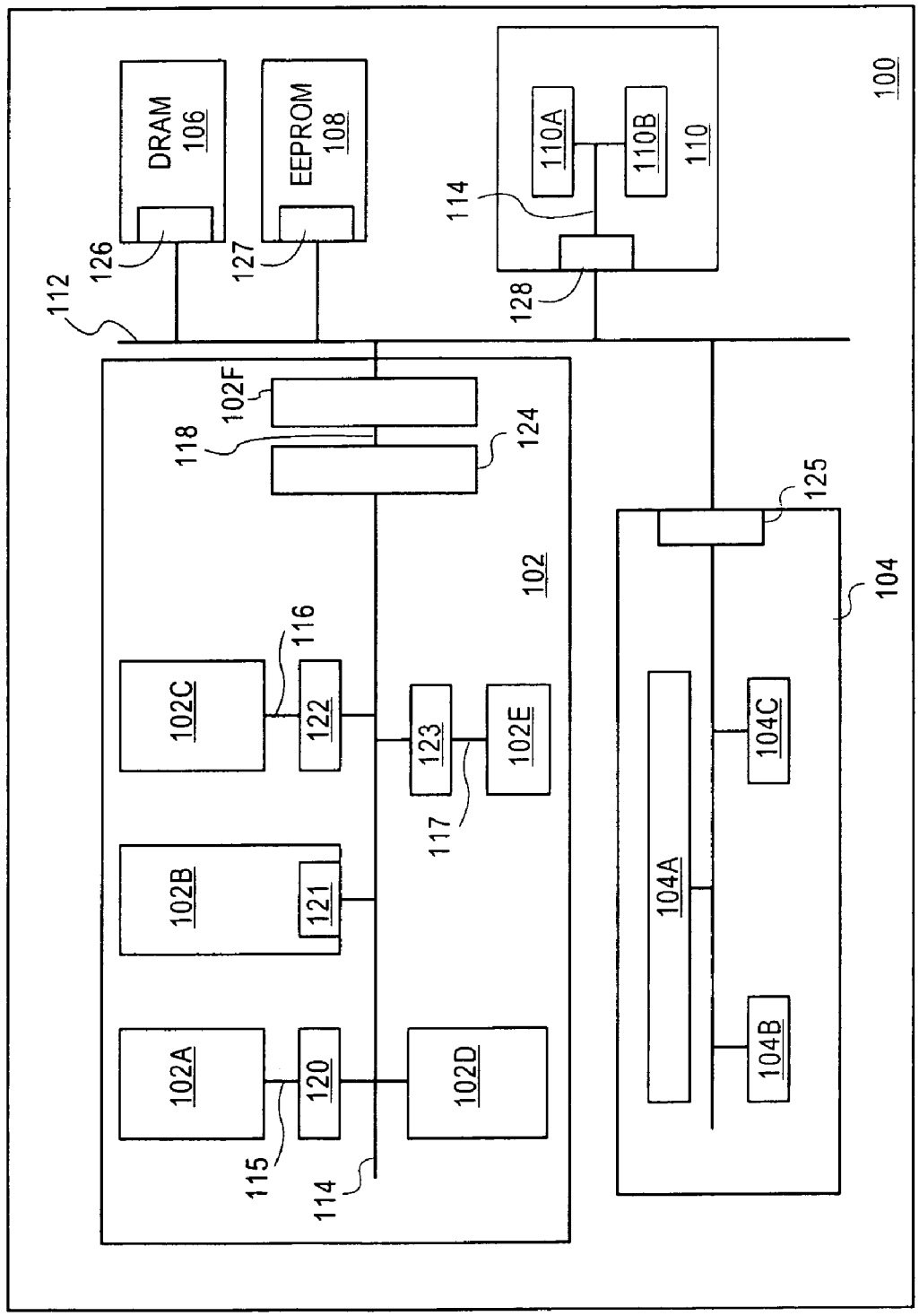
FIG. 1 illustrates a block diagram of a complex electronics system.

FIG. 1 is a block diagram of a complex electronics system 100. Shared communications bus 112 connects sub-systems

102, 104, 106, 108, and 110. Sub-systems are typically functional blocks including an interface module for interfacing to a shared bus. Sub-systems may themselves include one or more functional blocks and may or may not include an integrated or physically separate interface module. In one embodiment, the sub-systems connected by communications bus 112 are separate integrated circuit chips. In another embodiment, the sub-systems connected by communications bus 112 are Intellectual Property cores on a system on a chip.

For example, Sub-system 104 may be an application specific integrated circuit (hereinafter "ASIC"), which, as is known, is an integrated circuit, designed to perform a particular function. Sub-system 106 is a dynamic random access memory (hereinafter "DRAM"). Sub-system 108 is an erasable, programmable, read only memory (hereinafter "EPROM"). Sub-system 110 is a field programmable gate array (hereinafter "FPGA"). Sub-system 102 is a fully custom integrated circuit designed specifically to operate in system 100. Other embodiments may contain additional sub-systems of the same types as shown or other types not shown. Other embodiments may also include fewer sub-systems than the sub-systems shown in system 100. Integrated circuit 102 includes sub-systems 102A, 102B, 102C, 102D and 102E. ASIC 104 include functional blocks 101A, 104B and 104C. FPGA 110 includes functional blocks 110A and 110B. A functional block may be a particular block of logic that performs a particular function, a memory component on an integrated circuit, etc.

System 100 is an example of a system that may consist of one or more integrated circuits, chips, or functional IP cores on a single chip. A functional block may be a logic block on an integrated circuit such as, for example, functional block 102E, or a functional block may also be an integrated circuit such as fully custom integrated circuit 102 that implements a single logic function.

An interconnect such as, a shared communications bus 112, provides a shared communications bus between sub-systems of system 100. Shared communication bus 114 provides a shared communications bus between sub-systems or functional blocks on a single integrated circuit. Some of the functional blocks shown are connected to interface modules through which they send and receive signals to and from shared communications bus 112 or shared communications bus 114. Interface interconnects 115, 116, 117, and 118 are local point-to-point interconnects for connecting interface modules to functional blocks.

Agents, such as interface modules 120-128, are connected to various functional blocks as shown. In this embodiment, interface modules 120, 122, 123 and 124 are physically separated from their connected functional block (A, B, C, E and F, respectively). Interface modules 121, and 125-128 are essentially part of their respective functional blocks or sub-systems. Some functional blocks, such as 102D, do not require a dedicated interface module. The arrangement of sub-systems, functional blocks and interface modules is flexible and is determined by the system designer.

In one embodiment there are four fundamental types of functional blocks. The four fundamental types are initiator, target, bridge, and snooping blocks. A typical target is a memory device, and a typical initiator is a central processing unit (CPU). However any block may be a target or an initiator. A typical bridge might connect shared communications buses 112 and 114. Functional blocks all communicate with one another via shared communications bus 112 or shared communications bus 114 and the protocol of one embodiment. Initiator and target functional blocks may communicate a shared communications bus through interface modules. An initiator functional block may communicate with a shared communications bus through an initiator interface module and a target functional block may communicate with a shared communications bus through a target interface module.

An initiator interface module issues and receives read and write requests to and from functional blocks other than the one with which it is associated. In one embodiment, an initiator interface module is typically connected to a CPU, a digital signal processing (hereinafter "DSP") core, or a direct memory access (hereinafter "DMA") engine.

The shared communication bus 112 may have an end-to-end width conversion mechanism to convert data widths between an initiator interface module and a target interface module. Two or more potential branches of pathways within the shared bus may exist between the initiator agent and the two or more potential target interface modules. The conversion mechanism uses a lookup table that includes data width information of the initiator interface module and the two or more potential branches of pathways to the two or more target interface modules to concurrently pre-compute width conversion signals for each of the target agent branches.

Similarly, the initiator interface module may include an end-to-end burst conversion mechanism to allow the initiator and target functional blocks to communicate, by generating burst conversion signals, independent of the initiator and target functional blocks needing to adapt their burst capabilities.

Note, the interconnect shown in FIG. 1 illustrates a bus-based interconnect. However, the interconnect may be implemented in many ways such as point-to-point, switched or routed networks.

Figure 2:
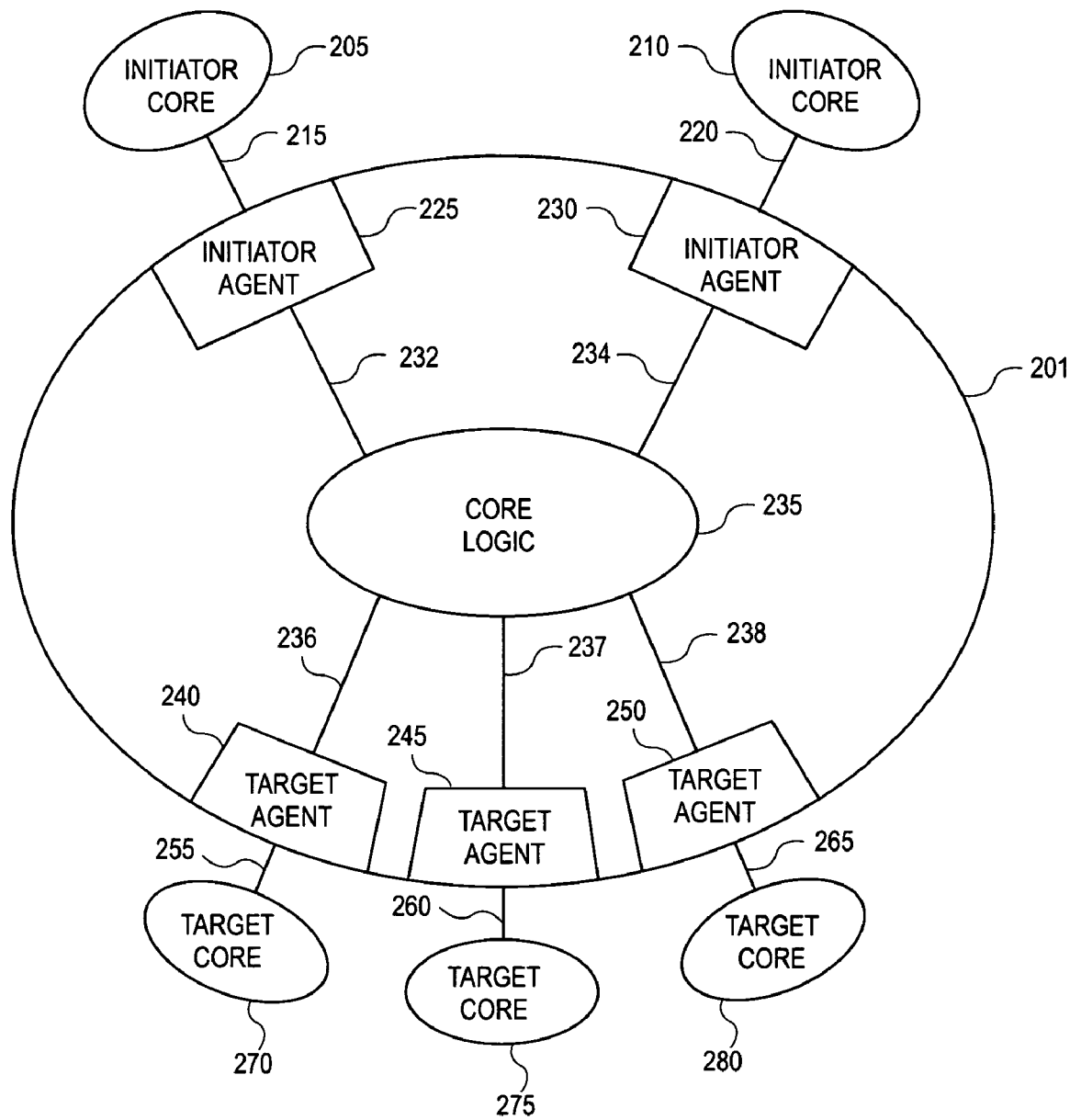
FIG. 2 illustrates a group of intellectual property cores and how they are interconnected.

FIG. 2 illustrates an exemplary group of intellectual property cores, their corresponding agents, an interconnect and its logic core. In system 200, there exists two initiator cores (hereinafter "IC"): initiator core 205 and initiator core 210. IC 205 is coupled to initiator agent (hereinafter "IA") 225 via interface communication lines 215. IC 210 is coupled to IA 230 via interface communication line 220. There also exist three target cores (hereinafter "TC"): target core 270, target core 275 and target core 280. TC 270 is coupled to target agent (hereinafter "TA") 240 via interface communication line 255. TC 275 is coupled to TA 245 via interface communication line 260. TC 280 is coupled to TA 250 via interface communication line 265.

Interconnect 201 comprises a logic core 235 as well as all the initiator and target agents (e.g., IA 225, IA 230, TA 240, TA 245 and TA 250). IA 225 is coupled to logic core 235 via interface communication line 232. IA 230 is coupled to logic core 235 via interface communication line 234. TA 240 is coupled to logic core 235 via interface communication line 236. TA 245 is coupled to logic core 235 via interface communication line 237. TA 250 is coupled to logic core 235 via interface communication line 238.

Both possibilities may exist in communications systems 1) where initiator agents send read requests and target agents correspond by sending data responses; and 2) where initiator agents send write requests with data to a target agent and the target agent sends a response. Thus two possibilities exist for data width conversion: one for writes (where data moves from initiator to target) and one for reads (where data moves from target to initiator). In the read request case, the initiator agent sends a data request based on the width support of the initiator IP core and the target agent sends the data response, which subsequently may need to undergo several width conversions along the interconnect to the initiator agent. In this case, logic in the initiator agent may generate one or more helper signals. A helper signal just accompanies the data request to the target agent and is used with the data response. In the data write case, initiator agents send a request and data to a target agent that subsequently may need to undergo several width conversions along the interconnect to the target agent. The helper signal helps convert width of the data signals from the initiator agent along the way to the target agent.

The case where an initiator sends a write request and data will be used as an example and be described below.

In one embodiment. IC 205 may need to send data to TC 280. IC 205 sends the data, via interface communication line 215 to IA 225. IA 225, which is inside interconnect 201, then transmits the data, via interface communication line 232, to core logic 235. Any processing which may need to take place may occur within core logic 235: Next, the data is transmitted, via interface communication line 238, to TA 250. Lastly, the data reaches TC 280, via interface communication line 265.

Figure 3:
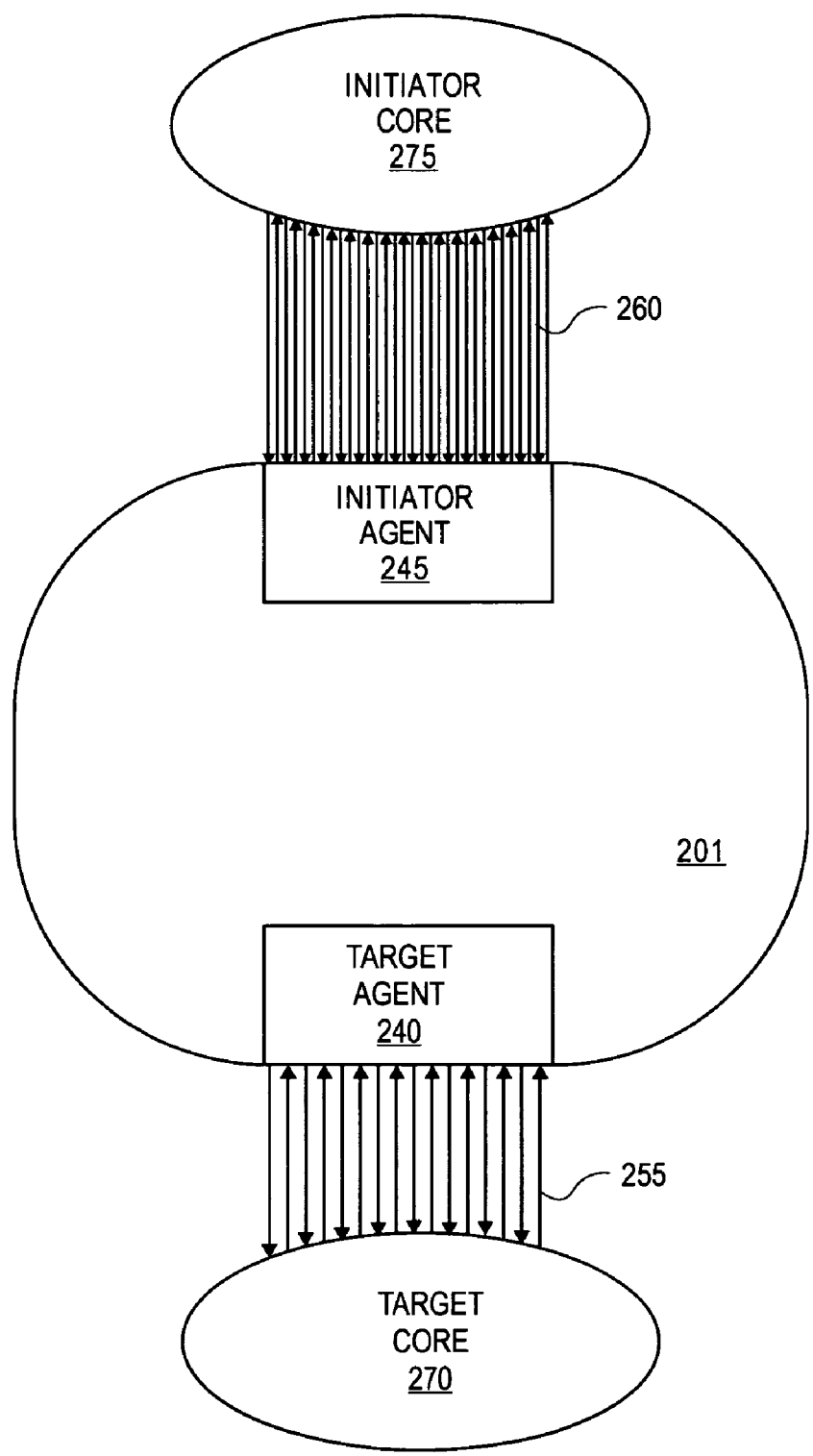
FIG. 3 illustrates a close-up view of FIG. 2, specifically the connection paths between intellectual property cores and their corresponding agents.

FIG. 3 illustrates a close-up view of FIG. 2, specifically the interface communication lines between an agent and its corresponding core. TA 240 is coupled to TC 270 via interface communication line 255 and IA 245 is coupled to IC 275 via interface communication line 260. In this embodiment, the width of interface communication line 255 is 16 bits wide. This is shown by the multiple wires in communication line 255. On the other hand, the width of interface communication line 260 is 32 bits wide. Hence, there are more individual wires in interface communication line 260. Depending on characteristics such as data width, burst support, etc., the number of actual wires in a communication line may vary dramatically. Common communication line widths include: 8-bit, 16-bit, 32-bit, 64-bit, 128-bit and 256-bit.

Figure 4:
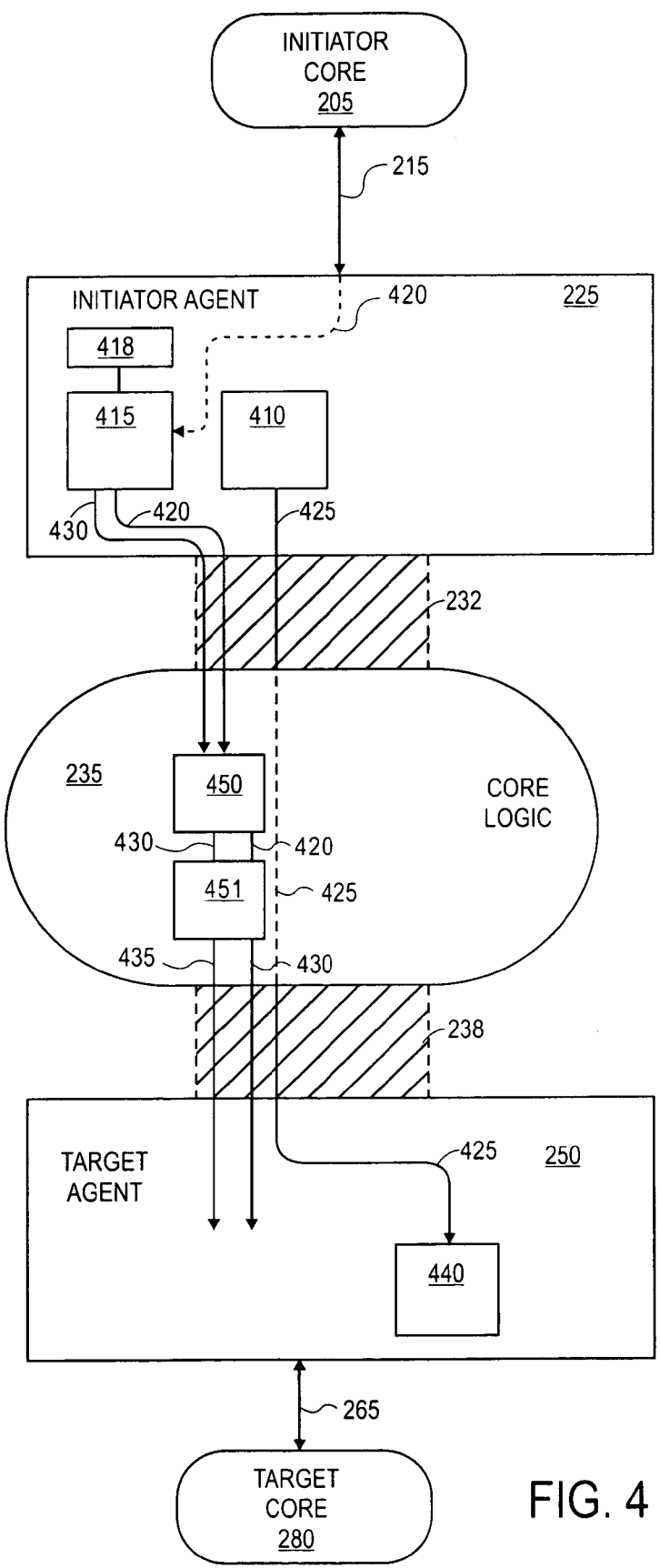
FIG. 4 illustrates width and burst conversion units within an initiator agent and how such units interconnect with an interconnect core and a target agent.

FIG. 4 illustrates the process by which data is sent from IC 205 to TC 280. In this embodiment the data width and burst characteristics of each intellectual property core may be different. Therefore width and burst conversion shall be required. An interconnect between IC 205 and TC 280 may contain IA 225, TA 250, and Core logic 235. IA 225 is capable of sending and receiving data to/from IC 205 via interface communication line 215. IA 225 includes width determination unit (hereinafter "WDU") 415, and burst conversion unit (hereinafter "BCU") 410. IA 225 is coupled to Core Logic 235 via interface communication line 232. In this embodiment, interface communication line's 232 data width is 16 bits in width. Core Logic 235 includes one or more width conversion units such as a first WCU 450 and a second WCU 451.

TA 250 is capable of sending and receiving data to/from TC 280 via interface communication line 265. TA 250 comprises burst conversion unit 440. TA 250 is coupled to Core Logic 235 via interface communication line 238. In this embodiment, interface communication line's 238 data width is 32 bits in width making it twice as wide as interface communication line 232.

In this embodiment, IC 205 wishes to send data to TC 280. The data width of the two cores differs. Hence, data width conversion is required. The data 420 is sent from IC 205 to IA 225 via interface communication line 215. As stated above, the data is 16-bit. Once data 420 is received by IA 225, WDU 415 queries data lookup table 418 to determine the data width of all possible target cores physically coupled to IA 225, as well as all the possible pathways between IA 225 and the possible target cores. With the information provided by data lookup table 418, WDU 415 is able to determine the data width of each possible target core (e.g., any target core that is physically cable of receiving data from IC 205.) In another embodiment WDU 415 may possess internal logic comprising the data width of all possible pathways between IA 225 and the possible target core, thus eliminating the need for data lookup table 418. WDU 415 generates width conversion signals for all possible target cores and their physical pathways, regardless of which target core is the eventual recipient of the data. The generation of all width conversion signals occurs in parallel (shown further in FIG. 5). As a result, the generation of all width conversion signals shall be completed at substantially the same time.

In one embodiment, the data lookup tables for each instance of an agent include the same data. This data includes the data width capabilities of all the potential target agents in the complete system as well as all the physical pathways to them. Hence every agent would have the identical data lookup table. In another embodiment, every instance of an agent would possess internal logic comprising the data width capabilities of all the potential target agents in the complete system, as well as all the physical pathways to them. Hence, the logic of each initiator agent would contain the same data. In another embodiment, each instance of an agent may include a data lookup table customized to merely contain data about the target agents that may communicate with that initiator agent. In such a scenario, each data lookup table could comprise different data. In another embodiment, each instance of an agent may possess customized internal logic to merely contain data about the target agents that may communicate with that initiator agent. Hence, the logic in each initiator agent could comprise different data.

Figure 5:
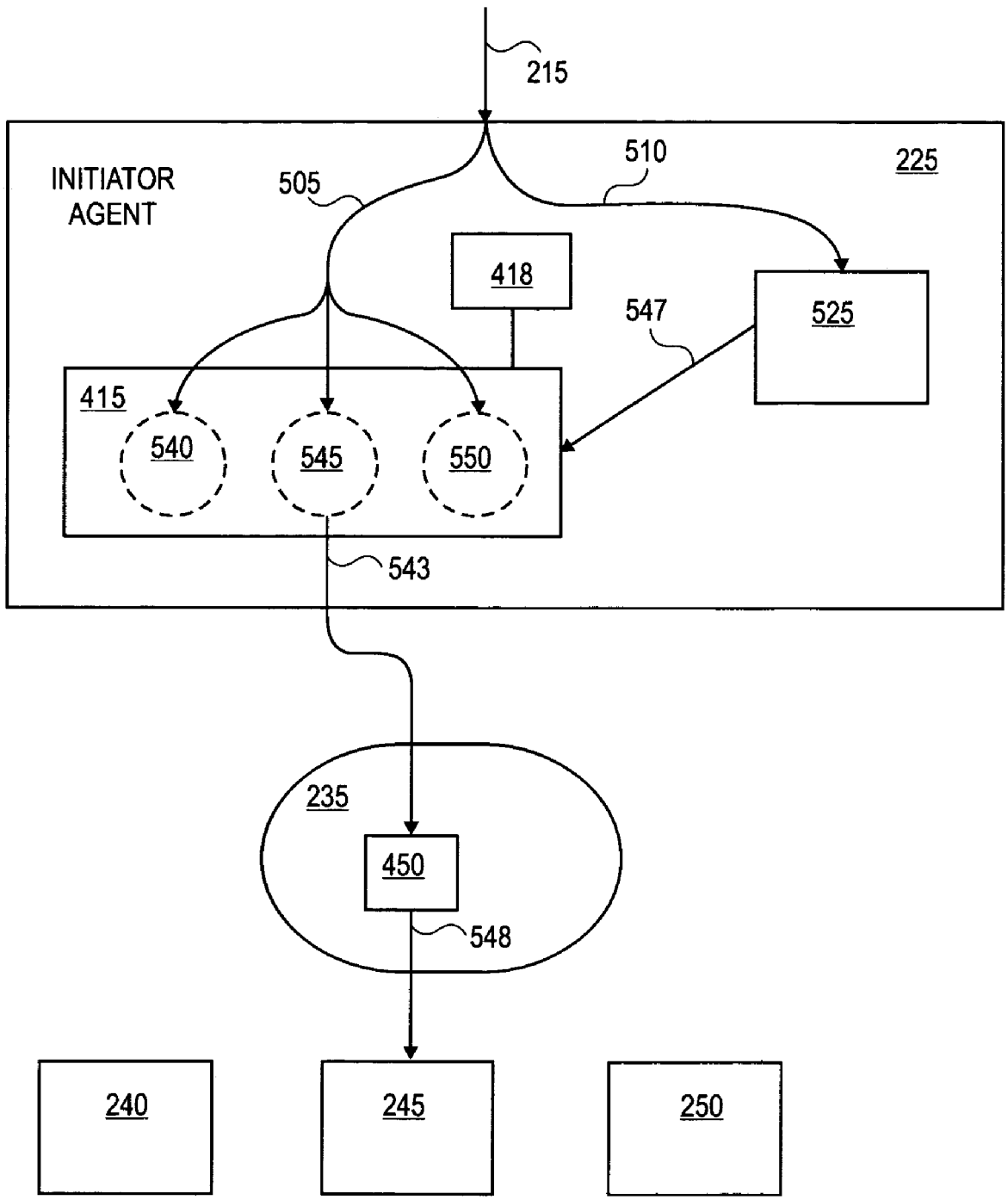
FIG. 5 illustrates the parallel processing of width/burst conversion signals and address decoding.

Further, the generation of the width conversion signals occurs in parallel to the address decoding of the eventual target (described further in FIG. 5). Thus, the generation of all width conversion signals is being computed in parallel to the target address decoding of the signal containing data 420. The address decode informs IA 225 which actual target core requires the data. The parallel processing of the address decode and width conversion signals provides an advantage over the prior art by pre-computing width conversion signals while IA 225 would otherwise be waiting for the address decode to complete. In a prior art system, the address decode and the width conversion are completed one after the other (e.g., serially). Such an approach is slower than the system illustrated in FIG. 4. Once the address decode is complete, IA 225 knows that data 420 is to be transmitted to TC 280. Since the width conversion for TA 280 has already been computed, time is saved over the prior art's serial-based approach.

Initiator agents also comprises logic, along with the help of a width determination unit, to generate a helper signal to direct the conversion of data widths between the initiator agent and a target agent by identifying characteristics of a group of data and how the data may be width converted, to enable subsequent conversion stages to accomplish the width conversion. In this example, WDU 415 sends helper signal 430 to WCU 450. Helper signal 430 assists WCU 450 in the actual width conversion of data 420 from 16-bit to 32-bit by instructing WCU 450 in what way data 420 needs to be converted. WCU 450 has also received data 420 from IA 225. Hence, WCU 450 now possesses data 420 and helper signal 430, allowing it to complete the width conversion. Core Logic 235 also comprises a second WCU 451 that performs a second width conversion of data 420 with the assistance of helper signal 430. An example of two width conversions has been described but the number of width conversions occurring in Core Logic 235 should not be so limited. It is possible for numerous width conversions to occur in Core Logic 235 before data 420 is passed to TC 280. (Note: FIG. 7 illustrates a table of helper signal types and the usage of each type.) Under this approach, very little processing is done in Core Logic 235. Most of the processing is accomplished on the outside perimeter of interconnect 201 (e.g., the initiator and target agents). This frees up Core Logic 235 for other tasks and allows it to be small and fast.

Core Logic 235 spends a small amount of time performing the actual width conversion of data 420 from 16-bit to 32-bit, through the assistance of width conversion helper signal 430. The converted data 435 is sent to TA 250, in 32-bit form, via 32-bit interface communication line 238. Core Logic 235 also relays helper signal 430 to TA 250. This proves useful in the event that TA 250 returns data to IA 225. TA 250 will not be required to generate helper signals since they are already available. Lastly, TA 250 sends the data to TC 265 via interface communication line 265.

Figure 9:
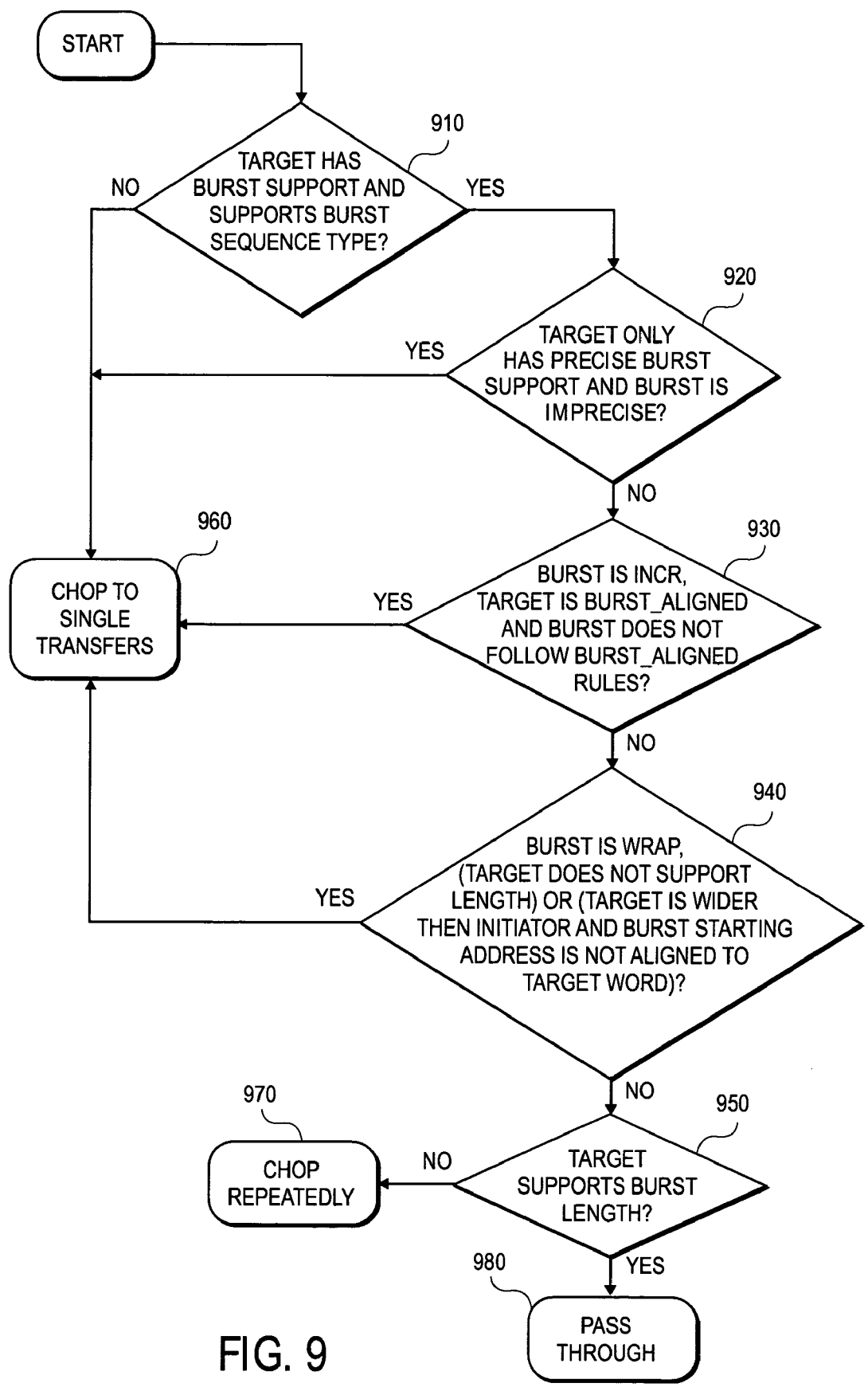
FIG. 9 illustrates a flow process to determine which type of burst conversion shall be used when burst data is sent from an initiator to a target.

In another embodiment, IC 205 needs to send burst data to TC 280. However, IC 205 has different burst capabilities than TC 280. It is possible that one or more potential target cores, coupled to the interconnect, have a burst capability different from the initiator core's burst capability such that a burst conversion unit may generate burst conversion signals for each of the potential target cores. Under such a scenario, an initiator agent compares its supported burst features to the supported burst features of the target agent to determine how to transmit a burst request from the initiator agent to the target agent via the interconnect. FIG. 8 illustrates some different types of burst characteristics and the options/choices for each. Further characteristics of burst types can be found in Open Core Protocol Specification Release 2.0 published by the OCP/IP Organization in November, 2003 and is hereby incorporated by reference. In this example, IC 205 and TC 280 have different burst length precision and request types. As such, the burst data must be converted to allow TC 280 to receive it from IC 205. (Note: FIG. 9 will subsequently describe the different types of burst conversion and how they are performed.)

First, the burst data is received by IA 225 from IC 205 via interface communication line 215. BCU 410 is responsible for converting the burst data to characteristics compatible with the target core. BCU 410 generates burst conversion signals for all possible target cores that could physically receive the burst data. A data lookup table may provide the burst characteristics of each target core.

In one embodiment, the data lookup table may comprise burst data of all the target agents in the entire system, regardless of whether IA 225 communicates with them. This embodiment would provide for generic burst data lookup tables that are the same for all agents. Under this embodiment the generation of burst conversion signals would result in having conversion signals generated for every possible burst type in the system, regardless of whether an agent with such burst characteristics communicates to IA 225. In another embodiment, every agent would possess internal logic comprising the burst capabilities of all the potential target agents in the complete system. Hence, the logic of each initiator agent would contain the same burst data. In another embodiment, the burst data lookup table is customized to merely include burst data for target agents that communicate with IA 225. Such an embodiment would allow for different information in each data lookup table. Under this embodiment the generation of burst conversion signals would result in conversion signals merely being generated for the burst characteristics of target agents that can communicate with IA 225. In another embodiment, each agent may possess customized internal logic to merely contain burst capabilities of the target agents that may communicate with that initiator agent. Hence, the logic in each initiator agent could comprise different data.

The generation of conversion signals occurs in parallel, allowing the conversion signals to complete at substantially the same time. Further, the address decode must also be processed. The address decode informs IA 225 which target core requires the burst data. As with width conversion, the address decode processing occurs in parallel to the generation of the burst conversion signals. This offers an advantage of the prior art, which would process the address decode first and then generates the burst conversion signals afterwards. Once the address decode is complete, IA 225 knows that the burst data is to be transmitted to TC 280. Since the burst conversion for TA 280 has already been computed, time is saved over the prior art's serial approach.

At this point, BCU 410 transmits the converted burst data 425 via interface communication line 232 into Core Logic 235. Since the burst conversion has already been completed, Core Logic 235 is not required to perform any processing. All processing was reserved for the outside perimeter of interconnect 201. Since Core Logic 235 does not need to process any of the burst data 425, the data passes directly through Core Logic 235 (noted by the dotted line) and into TA 250 via interface communication line 238. Lastly, burst data 425 has some final conversion that occurs in BCU 440, before passing to TC 280 via interface communication line 265.

FIG. 5 further illustrates the process by which width conversion occurs in parallel to address decoding. IA 225 comprises WDU 415 and address decoder 525. In this embodiment there are three target agents that could physically receive data from IA 225. These include TA 240, TA 245 and TA 250. In this example data is passed from IC 205 (not shown) to IA 225 via interface communication line 215. This data includes address decode information 505 and 510. At this point, address decoder 525 begins decoding the address of the target core awaiting this data. While the address decoding occurs, WDU 415 receives information from data lookup table 418. This table provides WDU 415 with a list of all the target agents, and their data width, that could physically receive data from IA 225. WDU 415 uses this information to concurrently generate width conversion signals for all three possible target agents. This can be seen by the three processes running in parallel within WDU 415. Process 540 generates width conversion signals for TA 240; Process 545 generates width conversion signals for TA 245; and Process 550 generates width conversion signals for TA 250.

Once address decoder 525 completes its address decode, it passes the target identity 547 to WDU 415. WDU 415 now knows that TA 245 is to receive the data. Hence, the helper signals 543 generated by process 545 are passed to width converter logic 450 within Logic Core 235. As noted in FIG. 4, the majority of the processing is accomplished outside Logic Core 235 and pushed to the outside perimeter of interconnect 201. The processing done by Logic Core 235 is the actual width conversion (through the help of helper signals 543). Once the width conversion is complete, the width converted data 548 passes to TA 245.

Figure 6:
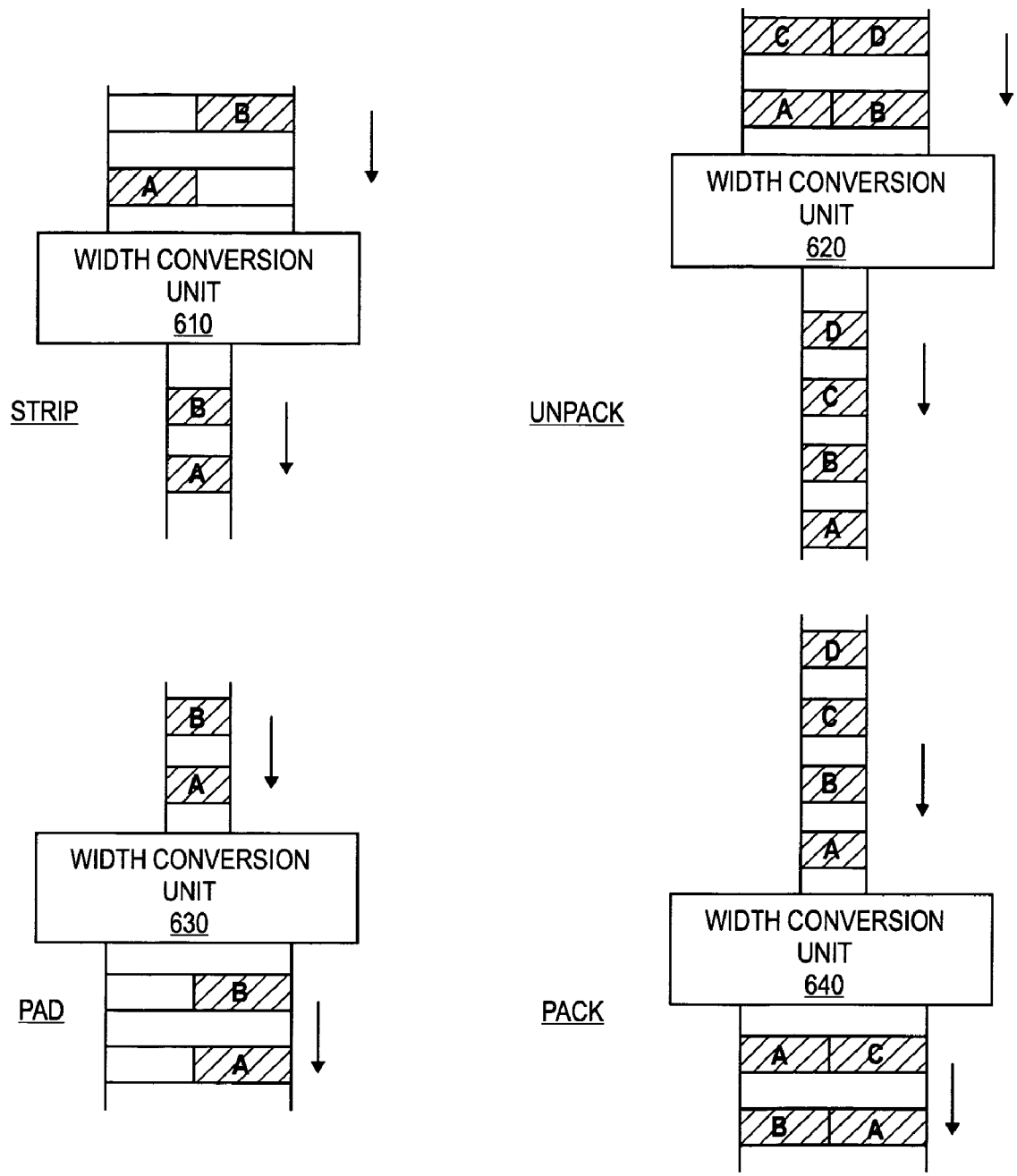
FIG. 6 illustrates exemplary types of width conversion types that may occur when transmitting data between intellectual property cores.

FIG. 6 illustrates different types of width conversions that may take place in the interconnect core. These four types are merely examples and are not meant to be the only types available. WCU 610 is responsible for using a Strip Technique for converting two words that are 2× wide but merely have data in half the word. For example, the second word contains "B" in the second half of the word, while being padded with meaningless code in the first half of the word. The first word contains "A" in the first half of the word, while being padded with meaningless code in the second half of the word. WCU 610 converts the 2× wide words to 1× wide by stripping the padded spaces in each word. The result is 2 words that are 1× wide, but still contain the complete data of "A" and "B".

WCU 620 is responsible for using an Unpack Technique for converting two words that are 2× wide into four words that are 1× wide. The first word contains "A" and "B" and the second word contain "C" and "D". WCU 620 converts the two 2× wide words by unpacking the two parts of each word into individual words that are 1× wide. The result is four words that are 1× wide, where each word contains "A", "B", "C", and "D" consecutively.

WCU 630 is responsible for using a Pad Technique for converting two words that are 1× wide into two words that are 2× wide. The first word contains "A" and the second word contains "B". Since the resulting words are twice the width of the starting words WCU 630 pads each 2× word with a space. The result is a first 2× word that has a space in the first half and "B" in the second half followed by a second 2× word that has a space in the first half and "A" in the second half.

WCU 640 is responsible for using a Pack Technique for converting four words that are 1× wide into two words that are 2× wide. The four 1× words contain "A", "B", "C", and "D", consecutively. WCU 640 packs two of the 1× words into a single 2× word. The result is a first 2× word that has "B" in the first half and "A" in the second half followed by a second 2× word that has "D" in the first half and "C" in the second half.

FIG. 9 illustrates a flowchart of different types of burst conversions that may occur by a Burst Conversion Unit within an Initiator Agent sending burst data to a Target Agent. This flowchart provides example embodiments and is no way meant as the only types of burst conversion. FIG. 9 describes three types of burst conversion; 1) pass through un-chopped; 2) chop repeatedly; and 3) chop to single transfers. It is desirable to keep the burst length as long as possible, hence chopping to single transfers would be the least preferred conversion, with pass-through un-chopped being the preferred conversion. "Pass through un-chopped" means that no burst conversion is actually required and the data may pass directly through without alteration. This technique would be used if the target supports the incoming burst sequence type and length, and there are no other special chopping conditions. "Chop Repeatedly" means to repeatedly chop the burst data to limit the size of each outgoing interconnect burst. Specifically this means generating additional burst requests with a smaller length associated with the additional burst request and continually subtracting from the initial burst length until it reaches zero. This technique would be used if the target supports the incoming burst sequence type but not the length, and there are no other special chopping conditions. "Chop to Single transfers" means converting the burst into a stream of single initiator transfers, hence removing the burst altogether and converting it into multiple, single transfers. This technique would be used if 1) the target does not support the incoming burst type or has no burst support; or 2) the target merely has precise burst support, but the incoming burst is imprecise; or 3) if the burst is an incrementing address (INCR) burst request AND the target is burst-aligned, but the incoming burst does not follow burst-alignment rules; or 4) if the burst is a burst request (WRAP) burst AND (the target does not support the length of the incoming burst) OR [(the target is wider than the initiator) AND (the starting address is not aligned to a target word)]. Such single transfer requests are treated as precise bursts of a one response solicited per one request.

Certain criteria are used to determine which burst conversion type may be used. At the start of the flow process in FIG. 9, it must be determined whether the target has burst support and if it supports the burst sequence type 910. If the answer is "No", the burst conversion type used is "Chop to Single Transfers" 960 and the flow ends. If the answer is "Yes" than it must be determined if the target merely has precise burst support and if the burst is imprecise 920. If the answer is "Yes", the burst conversion type used is "Chop to Single Transfers" 960 and the flow ends. If the answer is "No," then it should be determined if the burst is an incrementing address (INCR) burst request and if the target is burst-aligned and if the burst does not follow burst-aligned rules 930. If the answer is "Yes", the burst conversion type used is "Chop to Single Transfers" 960 and the flow ends. If the answer is "No," then it should be determined if the burst is a wrapping address over two multiple initiator words burst request (WRAP) burst and if the target does not support the burst length OR if the target data width support is wider than the initiator and if the burst starting address is not aligned to the target word 940. If the answer is "Yes", the burst conversion type used is "Chop to Single Transfers" 960 and the flow ends. If the answer is "No," then it should be determined if the target supports the burst length 950. If the answer is "Yes", the burst conversion type used is "Pass Through" 980 and the flow ends. If the answer is "No", the burst conversion type used is "Chop Repeatedly" 970 and the flow ends.

As stated above, the three burst conversion techniques described are not conclusive. Other techniques or criteria may be used to alter a burst stream. A person of ordinary skill in the art would be able to implement other burst conversion techniques.

In one embodiment, the software used to facilitate the protocol and algorithms associated with the width and burst conversion can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. For example, the information representing the apparatuses and/or methods may be contained in an Instance, soft instructions in an IP generator, or similar machine-readable medium storing this information.

The IP generator may be used for making highly configurable, scalable System On a Chip inter-block communication systems that integrally manages data, control, debug and test flows, as well as other applications. In an embodiment, an example intellectual property generator may comprise the following: a graphic user interface; a common set of processing elements; and a library of files containing design elements such as circuits, control logic, and cell arrays that define the intellectual property generator. In an embodiment, a designer chooses the specifics of the interconnect configuration to produce a set of files defining the requested interconnect instance. An interconnect instance may include front end views and back end files. The front end views support documentation, simulation, debugging, and testing. The back end files, such as a layout, physical LEF, etc are for layout and fabrication.

What is claimed is:

1. An apparatus, comprising:
an initiator agent coupled to a first Intellectual Property (IP) core within a device;
two or more target agents, each target agent coupled to its own IP core within the device; and an interconnect coupled to the initiator agent and the two or more target agents, the interconnect, which includes an end-to-end width conversion mechanism, the conversion mechanism to convert data widths between the initiator agent and a first target agent of the two or more target agents, wherein one or more branches of pathways in the interconnect exist between the initiator agent and the two or more target agents, the conversion mechanism to access data width information of the initiator agent and the one or more branches of pathways to the one or more target agents to concurrently pre-compute width conversion signals for each of the target agent branches while an address decoder generates an address decode for the first target agent, wherein the end-to-end width conversion mechanism to compute target-dependent width support and burst type support information across multiple groups of potential targets at the same time, and then selects a correct target-dependent information based upon the address decode result for the first target supplied by the address decoder.

2. The apparatus of claim 1 further comprising:
logic in the initiator agent to generate a helper signal to direct the conversion of data widths between the initiator agent and the first target agent by identifying characteristics of a group of data and how the data may be width converted, to enable subsequent conversion stages to accomplish the width conversion.

3. The apparatus of claim 1, wherein width conversion for each possible branch through the interconnect is calculated in parallel.

4. The apparatus of claim 2 further comprising an interconnect core, wherein one or more width conversion units within the core receive and use the helper signals to perform the width conversion.

5. The apparatus of claim 1, wherein the apparatus is a System on a Chip.

6. The apparatus of claim 1, wherein the conversion mechanism accesses data width information from a data lookup table.

7. The apparatus of claim 1, wherein the conversion mechanism accesses data width information from internal logic within the initiator agent.

8. A computer readable medium containing instructions stored thereon, which when executed by a machine, to cause the machine to generate a data representation of the apparatus of claim 1.

9. The apparatus of claim 1 wherein the initiator agent contains logic for data width and burst conversion corresponding to merely those potential pairs of initiator cores and target cores that can actually communicate with the initiator agent.

10. The apparatus of claim 1 wherein the data width information accessed by the conversion mechanism corresponds to merely those potential pairs of initiator cores and target cores that can actually communicate with the initiator agent.

11. An apparatus, comprising:
an initiator core supporting a first burst capability;
a target core supporting a second burst capability, wherein the support burst features of the second burst capability differs from the support burst features of the first burst capability;
an interconnect coupled to the initiator core and the target core;
a target agent coupled to the target core; and
an initiator agent coupled to the initiator core, the initiator agent comprising an end-to-end burst conversion mechanism to allow the initiator and target cores to communicate, by concurrently generating burst conversion signals while an address decoder generates an address decode of the first target agent, independent of the initiator and target cores needing to adapt their burst capabilities, wherein the end-to-end burst conversion mechanism to compute target-dependent width support and burst type support information across multiple groups of potential targets at the same time, and then selects a correct target-dependent information based upon the address decode result for the first target supplied by the address decoder.

12. The apparatus of claim 11 further comprising one or more potential target cores having a burst capability different from the first burst capability, the potential target cores coupled to the interconnect, wherein the burst conversion mechanism comprises a burst conversion unit to generate burst conversion signals for each of the one more potential target cores.

13. The apparatus of claim 12 wherein the burst conversion unit generates burst conversion signals for the target cores that can actually communicate with the initiator agent.

14. The apparatus of claim 11, wherein the initiator agent compares the supported burst features of the first burst capability of the initiator core and the supported burst features of the second burst capability of the target core to determine how to transmit a burst request from the initiator agent to the target agent via the interconnect.

15. The apparatus of claim 11, wherein the burst conversion signals are generated in parallel to a generation of an address decode, the address decode determines the identity of the target core.

16. A method for an end-to-end width conversion mechanism between an initiator agent and a first target agent from a plurality of target agents comprising:
querying data width information for the initiator agent and a plurality of branches of pathways to the plurality of target agents; and
using the data width information to concurrently pre-compute one or more width conversion signals for each of the plurality of branches of pathways to the plurality of target agents while an address decoder generates an address decode of the first target agent, wherein the end-to-end width conversion mechanism to compute target-dependent width support and burst type support information across multiple groups of potential targets at the same time, and then selects a correct target-dependent information based upon an address decode result for the first target supplied by the address decoder.

17. The method of claim 16 further comprising:
determining a correct width conversion signal from the one of more width conversion signals to direct the conversion of data widths between the initiator agent and the first target agent by identifying characteristics of a group of data and how the data may be width converted, to enable subsequent conversion stages to accomplish the width conversion.

18. The method of claim 16, wherein the data width information corresponds to merely those potential target cores that can actually communicate with the initiator agent.

19. The method claim 16, wherein the width conversion signals are generated in parallel to a generation of an address decode for the first target agent.

20. The method claim 16, wherein the width conversion for the plurality of branches of pathways is generated in parallel.

21. The method of claim 16 further comprising:
receiving the one or more helper signals; and using the one or more helper signals to perform the width conversion.

22. A computer readable medium containing instructions stored thereon, which when executed by a machine, to cause the machine to generate a data representation of the apparatus of claim 16.

23. The method of claim 16, wherein querying data width information from the initiator agent further comprises accessing data width information from a data lookup table.

24. The method of claim 16, wherein querying data width information from the initiator agent further comprises accessing data width information from internal logic within the initiator agent.

25. A method for an end-to-end burst conversion mechanism between an initiator agent and a first target agent from a plurality of target agents within a device comprising:
 querying burst characteristics of the initiator agent and the plurality of target agents within the device; and
 using the burst characteristics to concurrently pre-compute burst signals between the initiator agent and each of the plurality of target agents while an address decoder generates an address decode of the first target agent, wherein the end-to-end burst conversion mechanism to compute target-dependent width support and burst type support information across multiple groups of potential targets at the same time, and then selects a correct target-dependent information based upon the address decode result for the first target supplied by the address decoder.

26. The method of claim 25 wherein the burst signals are generated in parallel to a generation of an address decode for the first target agent.

27. The method of claim 25, wherein the pre-computing of burst signals is generated in parallel.

28. The method of claim 25, wherein querying burst characteristics further comprises accessing the burst characteristics from a data lookup table.

29. The method of claim 25, wherein querying burst characteristics further comprises accessing the burst characteristics from internal logic within the initiator agent.

30. The method of claim 25, wherein the burst characteristics correspond to merely those plurality of target cores that can actually communicate with the initiator agent.

31. A computer readable medium containing instructions stored thereon, which when executed by a machine, to cause the machine to generate a data representation of the apparatus of claim 25.

32. An apparatus for converting data widths between an initiator agent and a first target agent from a plurality of target agents comprising:
 means for querying a lookup table comprising data width information of the initiator agent and a plurality of branches of pathways to the plurality of target agents; and
 means for using the data width information to concurrently pre-compute one or more width conversion signals for each of the plurality of target agent branches while an address decoder generates an address decode of the first target agent, wherein the means for querying the lookup table is communicatively coupled to the means for using the data width information, wherein an end-to-end width conversion mechanism to compute target-dependent width support and burst type support information across multiple groups of potential targets at the same time, and then selects a correct target-dependent information based upon the address decode result for the first target supplied by the address decoder.

33. The apparatus of claim 32, further comprising:
 means for determining a correct width conversion signal from the one of more width conversion signals to direct the conversion of data widths between the initiator agent and the first target agent by identifying characteristics of a group of data and how the data may be width converted, to enable subsequent conversion stages to accomplish the width conversion, wherein the means for determining the correct width conversion signal is communicatively coupled to the means for using the data width information.

34. The apparatus of claim 32, wherein the width conversion signals are generated in parallel to a generation of an address decode for the first target agent and the width conversion for the plurality of branches of pathways are generated in parallel.

35. The apparatus of claim 32, further comprising:
 means for receiving one or more helper signals, wherein the means for using the data width information uses the one or more helper signals to perform the width conversion.

36. An apparatus for converting a data burst between an initiator agent and a first target agent from a plurality of target agents comprising:
 means for querying a lookup table comprising burst characteristics of the initiator agent and the plurality of target agents; and
 means for using the burst characteristics to concurrently pre-compute burst signals between the initiator agent and each of the plurality of target agents while an address decoder generates an address decode of the first target agent, wherein the means for querying the lookup table is communicatively coupled to the means for using the burst characteristics, wherein an end-to-end burst conversion mechanism to compute target-dependent width support and burst type support information across multiple groups of potential targets at the same time, and then selects a correct target-dependent information based upon the address decode result for the first target supplied by the address decoder.

37. The apparatus of claim 36 wherein the burst signals are generated in parallel to a generation of an address decode for the first target agent.

38. The apparatus of claim 36, wherein the pre-computing of burst signals is generated in parallel.

* * * * *